(12) United States Patent
Igarashi et al.

(10) Patent No.: US 8,784,960 B2
(45) Date of Patent: Jul. 22, 2014

(54) MULTILAYER STRUCTURE AND METHOD FOR PRODUCING SAME

(75) Inventors: Takeyuki Igarashi, Kurashiki (JP); Yasuhiko Haneda, Tokyo (JP); Masahiro Kitamura, Tokyo (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

(21) Appl. No.: 13/638,730

(22) PCT Filed: Mar. 30, 2011

(86) PCT No.: PCT/JP2011/058032
§ 371 (c)(1),
(2), (4) Date: Oct. 1, 2012

(87) PCT Pub. No.: WO2011/125751
PCT Pub. Date: Oct. 13, 2011

(65) Prior Publication Data
US 2013/0022768 A1    Jan. 24, 2013

(30) Foreign Application Priority Data
Mar. 31, 2010   (JP) .................................. 2010-081342

(51) Int. Cl.
*B32B 33/00* (2006.01)
*B29D 22/00* (2006.01)
*B28B 23/00* (2006.01)

(52) U.S. Cl.
USPC ........ 428/36.4; 428/215; 428/35.2; 428/35.7; 428/36.6; 264/173.11

(58) Field of Classification Search
USPC .............................. 428/36.4, 35.3, 35.7, 36.6
See application file for complete search history.

(56) References Cited

U.S. PATENT DOCUMENTS

| | | |
|---|---|---|
| 5,492,953 A | 2/1996 | Itamura et al. |
| 2010/0255330 A1 | 10/2010 | Ninomiya et al. |
| 2011/0091734 A1 | 4/2011 | Kazeto |
| 2012/0009431 A1 | 1/2012 | Kazeto |
| 2012/0196970 A1 | 8/2012 | Igarashi et al. |

FOREIGN PATENT DOCUMENTS

| | | |
|---|---|---|
| JP | 3 72542 | 3/1991 |
| JP | 3 262640 | 11/1991 |
| JP | 4 246533 | 9/1992 |
| JP | 4 255349 | 9/1992 |
| JP | 2002 234971 | 8/2002 |
| JP | 2002 234979 | 8/2002 |
| WO | 2009 041440 | 4/2009 |
| WO | 2010 071241 | 6/2010 |
| WO | 2010 079851 | 7/2010 |

OTHER PUBLICATIONS

U.S. Appl. No. 13/643,583, filed Oct. 26, 2012, Igarashi, et al.
U.S. Appl. No. 13/637,448, filed Sep. 26, 2012, Igarashi, et al.

*Primary Examiner* — Jennifer Chriss
*Assistant Examiner* — Camie Thompson
(74) *Attorney, Agent, or Firm* — Oblon, Spivak, McClelland, Maier & Neustadt, L.L.P.

(57) ABSTRACT

A multilayer structure, comprising: a layer of a resin composition (A); a layer of a saponified ethylene-vinyl acetate copolymer (B); and a layer of polyolefin (C) arranged on one side or both sides of those layers, wherein the resin composition (A) contains polyolefin (D), a saponified ethylene-vinyl acetate copolymer (E) and a saponified ethylene-vinyl acetate copolymer (F1) and/or an acid-modified ethylene-vinyl acetate copolymer (F2), the copolymer (E) has a mass ratio [E/(F1+F2)] of from 0.05 to 30, the polyolefin (D) has the copolymer (E) having an average particle diameter of from 0.1 to 1.8 μm dispersed in a matrix thereof, the layers of (A) and of (C) have thicknesses of from 50 to 1000 μm, and from 25 to 1000 μm, respectively, which enables provision of a multilayer structure having good gas barrier properties after retort processing and a good appearance.

16 Claims, No Drawings

MULTILAYER STRUCTURE AND METHOD FOR PRODUCING SAME

TECHNICAL FIELD

The present invention relates to a multilayer structure having a layer made of polyolefin and a layer made of a saponified ethylene-vinyl acetate copolymer and a method of producing the same.

BACKGROUND ART

Conventionally, multilayer structures including a layer made of polyolefin, such as polyethylene and polypropylene, and a layer made of a saponified ethylene-vinyl acetate copolymer (hereinafter, may be abbreviated as an EVOH) excellent in barrier properties are widely used for various applications, particularly such as food packaging containers and medicine containers, taking advantage of their barrier properties. Such a multilayer structure is used as various molded products, such as a film, a sheet, a cup, a tray, and a bottle. At this time, there is a case that offcuts, defective products, and the like generated when obtaining the various molded products are collected and melt molded to be reused as at least one layer of a multilayer structure including a polyolefin layer and an EVOH layer. Such a recovery technique is useful from the perspective of the reduction of wastes and the economic efficiency and is employed widely.

However, when reusing a recovery of a multilayer structure including a polyolefin layer and an EVOH layer, gelation occurs due to thermal degradation during the melt molding or a degraded material sticks inside an extruder, and thus it used to be difficult to carry out continuous melt molding for a long period of time. Further, since such a degraded material is often mixed into a molded product, there used to be problems of generating a fish eye and generating a phase separation foreign matter (die build-up) in a molded product thus obtained. There also used to be a problem of deteriorating the appearance due to the poor compatibility of the polyolefin and the EVOH. Food and medicine packaging containers often require processing, such as disinfection and sterilization, for the contents. However, since an EVOH has decreased gas barrier properties in conditions of high temperature and high humidity, there is a demand for a multilayer structure excellent in the gas barrier properties even after going through a high temperature and high humidity state during retort processing.

As a measure to solve such problems, Patent Document 1 describes a melt molding method of blending a resin composition, having a metal salt of fatty acid and/or hydrotalcite blended into an ethylene-vinyl acetate copolymer or a saponification product thereof, into a recovery of a layered product having an EVOH layer. According to this method, it is considered that long run moldability becomes good and generation of a deposit can be suppressed.

Patent Document 2 describes a resin composition made of polyolefin; a saponified ethylene-vinyl acetate copolymer having an ethylene content ratio of from 20 to 65 mol % and having vinyl acetate components with a degree of saponification of 96 mol % or more; at least one type of compound selected from a metal salt of higher fatty acid having a carbon number of from 8 to 22, a metal salt of ethylenediaminetetraacetic acid, and hydrotalcite; and a saponified ethylene-vinyl acetate copolymer having a percentage of ethylene content of from 68 to 98 mol % and having vinyl acetate components with a degree of saponification of 20% or more. It is considered that this resin composition has excellent compatibility, a molded object obtained using this resin composition has a surface with no wave pattern generated therein, and it has a good appearance.

Patent Document 3 describes a multilayer structure having a layer made of a resin composition having an ethylene-vinyl acetate copolymer and a saponified ethylene-vinyl acetate copolymer, having an ethylene content of 70 mol % or more, blended into a recovery of a layered product including a polyolefin-based resin layer and an EVOH layer. It is considered that, in this multilayer structure, a deposit and discoloration are suppressed to be excellent in appearance.

However, the inventions described in Patent Documents 1 through 3 used to have problems of a molded object thus obtained having insufficient gas barrier properties after retort processing and further possibly causing a defective appearance.

Patent Document 4 describes a layered product having an EVOH layer as an intermediate layer and made of a layer of a resin composition, containing a polyolefin-based resin, an EVOH, and a styrene-based thermoplastic elastomer via an adhesive layer, and polyolefin-based resin layers as inner/outer-most layers. It is considered that this layered product has good gas barrier properties in conditions of high temperature and high humidity, such as retort processing. However, since a price for a styrene-based elastomer is expensive as a resin, it is sometimes out of accordance with the economic efficiency.

Further, Patent Document 5 describes a multilayer structure having an EVOH layer as a gas barrier layer, arranged therein, unsaturated carboxylic acid-modified polyolefin layers on both sides thereof, amorphous polyamide layers on both sides thereof, resin composition layers on both sides thereof containing resins used for the EVOH layer, the propylene-based polymer layers, the unsaturated carboxylic acid-modified polyolefin layers, and the amorphous polyamide layers, and further propylene-based polymer layers on both sides thereof. It is described that the resin composition layers can be formed by reusing scraps generated when obtaining a molded object and a multilayer structure thus obtained has good gas barrier properties in conditions of high temperature and high humidity before and after retort processing. However, since it has a layer constitution of nine layers, molding devices are limited.

PRIOR ART DOCUMENTS

Patent Documents

Patent Document 1: JP 2002-234971A
Patent Document 2: JP 3-72542A
Patent Document 3: JP 2009-97010A
Patent Document 4: JP 4-246533A
Patent Document 5: JP 4-255349A

SUMMARY OF THE INVENTION

Problems to be Solved by the Invention

The present invention has made to solve the above problems, and it is an object of the present invention to provide a multilayer structure having a resin composition layer containing polyolefin and an EVOH, a polyolefin layer, and an EVOH layer, having good gas barrier properties after retort processing, and also having a good appearance and a method of producing the same.

Means for Solving the Problems

The above problems are solved by providing a multilayer structure, comprising: a layer of a resin composition (A); a layer of a saponified ethylene-vinyl acetate copolymer (B) having an ethylene content of from 20 to 65 mol % and having a degree of saponification of vinyl acetate units of 96% or more; and a layer of polyolefin (C) arranged on one side or both sides of those layers, wherein the resin composition (A) contains polyolefin (D), a saponified ethylene-vinyl acetate copolymer (E) having an ethylene content of from 20 to 65 mol % and having a degree of saponification of vinyl acetate units of 96% or more, and a saponified ethylene-vinyl acetate copolymer (F1) having an ethylene content of from 68 to 98 mol % and having a degree of saponification of vinyl acetate units of 20% or more and/or an acid-modified ethylene-vinyl acetate copolymer (F2) having an ethylene content of from 68 to 98 mol %, the saponified ethylene-vinyl acetate copolymer (E) has a mass ratio [E/(F1+F2)] of from 0.05 to 30 to a total amount of the saponified ethylene-vinyl acetate copolymer (F1) and the acid-modified ethylene-vinyl acetate copolymer (F2), the polyolefin (D) has the saponified ethylene-vinyl acetate copolymer (E) having an average particle diameter of from 0.1 to 1.8 μm dispersed in a matrix thereof, the layer of the resin composition (A) has a thickness of from 50 to 1000 μm, and the layer of the polyolefin (C) has a thickness of from 25 to 1000 μm.

At this time, it is preferred that the structure comprises: the layer of the resin composition (A); the layer of the saponified ethylene-vinyl acetate copolymer (B); and layers of the polyolefin (C) arranged on both sides sandwiching those layers, wherein both layers of the polyolefin (C) on both sides have a thickness of from 25 to 1000 μm.

It is preferred that the resin composition (A) further contains an unmodified ethylene-vinyl acetate copolymer (G), and the unmodified ethylene-vinyl acetate copolymer (G) has a mass ratio [G/(F1+F2)] to the total amount of the saponified ethylene-vinyl acetate copolymer (F1) and the acid-modified ethylene-vinyl acetate copolymer (F2) of from 0.1 to 15. It is also preferred that the resin composition (A) contains from 2 to 20 mass % of the saponified ethylene-vinyl acetate copolymer (E).

It is also preferred that layers of the resin composition (A) are arranged on both sides sandwiching the layer of the saponified ethylene-vinyl acetate copolymer (B), and the layer of the polyolefin (C) is further arranged on one side or both sides of all those layers. It is also preferred that layers of the resin composition (A) are arranged on both sides sandwiching the layer of the saponified ethylene-vinyl acetate copolymer (B), and layers of the polyolefin (C) are further arranged on both sides sandwiching all those layers. It is also preferred that the layer of the saponified ethylene-vinyl acetate copolymer (B) has a thickness of from 6 to 12% of a thickness of the entire multilayer structure. It is also preferred that the entire multilayer structure has a thickness of from 200 to 10000 μm. It is also preferred that the polyolefin (C) has a melting point of from 120 to 220° C. It is also preferred that the structure has an oxygen transmission rate after 24 hours passed since retort processed for 30 minutes at 120° C. and 0.15 MPa of from 0.1 to 6 cc/m$^2$·day·atm.

The above problems are also solved by providing a method of producing the multilayer structure, comprising melt molding the structure using the resin composition (A) obtained by melt kneading a scrap of a multilayer structure, having a layer of the polyolefin (D) and a layer of the saponified ethylene-vinyl acetate copolymer (E), and the saponified ethylene-vinyl acetate copolymer (F1) and/or the acid-modified ethylene-vinyl acetate copolymer (F2), the saponified ethylene-vinyl acetate copolymer (B), and the polyolefin (C).

The above problems are also solved by providing a multilayer container, comprising the above multilayer structure. At this time, it is preferred that the multilayer container is for retort processing.

A preferred embodiment of the present invention is a package, comprising: the above multilayer container; and a content filled in the container. At this time, it is preferred that the package is a retort processed package.

Effects of the Invention

According to the present invention, it is possible to provide a multilayer structure having a resin composition layer containing polyolefin and an EVOH, a polyolefin layer, and an EVOH layer, having good gas barrier properties after retort processing, and also having a good appearance and a method of producing the same.

Mode for Carrying Out the Invention

A multilayer structure of the present invention is a multilayer structure, comprising: a layer of a resin composition (A); a layer of a saponified ethylene-vinyl acetate copolymer (B) having an ethylene content of from 20 to 65 mol % and having a degree of saponification of vinyl acetate units of 96% or more (hereinafter, the copolymer (B) may be abbreviated as an EVOH (B)); and a layer of polyolefin (C) arranged on one side or both sides of those layers.

The resin composition (A) used here contains polyolefin (D), a saponified ethylene-vinyl acetate copolymer (E) having an ethylene content of from 20 to 65 mol % and having a degree of saponification of vinyl acetate units of 96% or more (hereinafter, the copolymer (E) may be abbreviated as an EVOH (E)), and a saponified ethylene-vinyl acetate copolymer (F1) having an ethylene content of from 68 to 98 mol % and having a degree of saponification of vinyl acetate units of 20% or more (hereinafter, the copolymer (F1) may be abbreviated as an S-EVOH (F1)) and/or an acid-modified ethylene-vinyl acetate copolymer (F2) having an ethylene content of from 68 to 98 mol % (hereinafter, the copolymer (F2) may be abbreviated as an acid-modified EVAc (F2)).

The polyolefin (D) contained in the resin composition (A) contains: (low density, linear low density, medium density, high density, or the like) polyethylene; an ethylene-based copolymer obtained by copolymerizing ethylene with α-olefins, such as 1-butene, 1-hexene, and 4-methyl-1-pentene, or acrylic ester; polypropylene; a propylene-based copolymer obtained by copolymerizing propylene with α-olefins, such as ethylene, 1-butene, 1-hexene, and 4-methyl-1-pentene; poly(1-butene), poly(4-methyl-1-pentene), or modified polyolefin obtained by reacting maleic anhydride to the polyolefin described above; an ionomer resin; or the like. Among all, a polypropylene-based resin, such as polypropylene and a propylene-based copolymer, or a polyethylene-based resin, such as polyethylene and an ethylene-based copolymer, is preferred, and a polypropylene-based resin is more preferred. One type of the polyolefin (D) may be used singly, or two or more types may also be used in combination.

The EVOH (E) contained in the resin composition (A) is obtained by saponifying vinyl acetate units in an ethylene-vinyl acetate copolymer. An EVOH having a less ethylene content and having a high degree of saponification of vinyl acetate units is prone to become defective in compatibility with polyolefin. In contrast, when an EVOH has an excessively large ethylene content, the gas barrier properties decrease. In addition, an EVOH having a low degree of saponification of vinyl acetate units is prone to become defective in thermal stability of the EVOH itself. From such perspective, the EVOH (E) has an ethylene content of from 20 to 65 mol %. It is preferred that the ethylene content is 25 mol % or more. The ethylene content is preferably 55 mol % or less and more preferably 50 mol % or less. Meanwhile, the degree of saponification of vinyl acetate units of EVOH (E) is 96% or more, preferably 98% or more, and even more preferably 99% or more. In particular, an EVOH having an ethylene content of from 20 to 65 mol % and having a degree of saponification of 99% is used particularly preferably in the present invention because containers excellent in gas barrier properties are obtained by using it in layers with polyolefin.

The EVOH (E) may also have another polymerizable monomer copolymerized therein as long as not inhibiting the effects of the invention, which is generally in a range of 5 mol % or less. Such polymerizable monomer may include, for example: α-olefins, such as propylene, 1-butene, 1-hexene, and 4-methyl-1-pentene; (meth)acrylic ester; unsaturated carboxylic acid, such as maleic acid, fumaric acid, and itaconic acid; alkyl vinyl ether; N-(2-dimethylaminoethyl) methacrylamide or its quaternary compounds, N-vinylimidazole or its quaternary compounds, N-vinylpyrrolidone, N,N-butoxymethyl acrylamide, vinyltrimethoxysilane, vinylmethyldimethoxysilane, vinyldimethylmethoxysilane, and the like.

The EVOH (E) has a melt index (MI; measured at 190° C., under the load of 2160 g) of preferably 0.1 g/10 minutes or more, more preferably 0.5 g/10 minutes or more. The EVOH (E) has an MI of preferably 100 g/10 minutes or less, more preferably 50 g/10 minutes or less, and most preferably 30 g/10 minutes or less. At this time, from the perspective of dispersibility of the EVOH (E), a ratio [MI (EVOH)/MI (PO)] when the MI of the EVOH (E) is MI (EVOH) and the MI (measured at 190° C., under the load of 2160 g) of polyolefin is MI (PO) is preferably from 0.1 to 100 and more preferably from 0.3 to 50. It should be noted that, for those having a melting point around 190° C. or more than 190° C., an MI is defined as a value obtained by measuring at a plurality of temperatures of the melting point or higher under the load of 2160 g and plotting the results with reciprocals of absolute temperatures as abscissa against logarithms of MFRs as ordinate in a semi-logarithmic graph for extrapolation to 190° C.

The resin composition (A) contains the S-EVOH (F1) having an ethylene content of from 68 to 98 mol % and having a degree of saponification of vinyl acetate units of 20% or more and/or the acid-modified EVAc (F2) having an ethylene content of from 68 to 98 mol %. The S-EVOH (F1) and the acid-modified EVAc (F2) have a high ethylene content and have an effect of significantly improving the compatibility of the polyolefin (D) and the EVOH (E). It is preferred that the S-EVOH (F1) and the acid-modified EVAc (F2) have respective ethylene contents of 70 mol % or more. Meanwhile, the S-EVOH (F1) and the acid-modified EVAc (F2) preferably have respective ethylene contents of 96 mol % or less and more preferably 94 mol % or less. When the S-EVOH (F1) and the acid-modified EVAc (F2) have the respective ethylene contents of less than 68 mol % or more than 98 mol %, the effect of improving the compatibility of the polyolefin (D) and the EVOH (E) becomes insufficient.

The S-EVOH (F1) has the ethylene content higher than the ethylene content of the EVOH (E). From the perspective of improving the compatibility of the polyolefin (D) and the EVOH (E), a difference between the ethylene content of the S-EVOH (F1) and the ethylene content of the EVOH (E) is preferably 10 mol % or more and more preferably 20 mol % or more. The acid-modified EVAc (F2) also has the ethylene content higher than the ethylene content of the EVOH (E). From the perspective of improving the compatibility of the polyolefin (D) and the EVOH (E), a difference between the ethylene content of the acid-modified EVAc (F2) and the ethylene content of the EVOH (E) is preferably 10 mol % or more and more preferably 20 mol % or more.

The S-EVOH (F1) and the acid-modified EVAc (F2) have respective MIs (measured at 190° C., under the load of 2160 g) of preferably 0.1 g/10 minutes or more, more preferably 0.5 g/10 minutes or more, and even more preferably 1 g/10 minutes or more. Meanwhile, the S-EVOH (F1) and the acid-modified EVAc (F2) have the respective MIs of preferably 100 g/10 minutes or less, more preferably 50 g/10 minutes or less, and even more preferably 30 g/10 minutes or less.

The degree of saponification of vinyl acetate units of S-EVOH (F1) is 20% or more, preferably 30% or more, and more preferably 40% or more. An upper limit of the degree of saponification is not particularly limited and it may also be 99 mol % or more, and it is also possible to use one substantially having a degree of saponification of approximately 100%. In a case that the degree of saponification of vinyl acetate units is less than 20%, the effect of improving the compatibility of the polyolefin (D) and the EVOH (E) becomes insufficient.

The S-EVOH (F1) may also be modified with unsaturated carboxylic acid or a derivative thereof, and such unsaturated carboxylic acid or a derivative thereof may include, for example, acrylic acid, methacrylic acid, maleic acid, fumaric acid, and itaconic acid; methyl or ethyl ester of the above acids; maleic anhydride, itaconic anhydride, and the like. One type of them may be used singly, or two or more types may also be used in combination.

The acid-modified EVAc (F2) is a product of grafting acid or a derivative thereof to an ethylene-vinyl acetate copolymer or a copolymer of ethylene, vinyl acetate, and acid or a derivative thereof. As the acid or a derivative thereof to be grafted to the ethylene-vinyl acetate copolymer, unsaturated carboxylic acid or a derivative thereof can be used, and it may include, for example, acrylic acid, methacrylic acid, fumaric acid, itaconic acid, and maleic acid; salt of the above acids; ester (methyl ester, ethyl ester, and the like) of the above acids; and anhydride of the above acids (maleic anhydride, itaconic anhydride, and the like). One type of them may be used singly, or two or more types may also be used in combination. Among them, maleic anhydride is used most preferably. The above acids and acid anhydrides may also be transformed partially to salt or ester by post-modification.

The grafting of unsaturated carboxylic acid or a derivative thereof to an ethylene-vinyl acetate copolymer can be carry out in a known method, and for example, an ethylene-vinyl acetate copolymer is in a state of dissolved in an appropriate solvent or melt by an extruder and a radical initiator is added thereto for activation, followed by adding acid or a derivative thereof for grafting, thereby enabling to obtain the acid-modified ethylene-vinyl acetate copolymer (F2).

As the acid to be grafted to the ethylene-vinyl acetate copolymer, it is possible to use a compound having a boronic acid group or boron-containing groups capable of being converted into a boronic acid group in the presence of water. Here, the boronic acid group is a group represented by the following formula (I).

[chem. 1]

(I)

The boron-containing group capable of being converted into a boronic acid group in the presence of water (hereinafter, abbreviated as a boron-containing functional group) indicates a boron-containing group that can be hydrolyzed in the presence of water to be converted into a boronic acid group. More specifically, the above boron-containing group means a functional group capable of being converted into a boronic acid group when being hydrolyzed under conditions of from room temperature to 150° C. for from 10 minutes to 2 hours by use, as a solvent, of water only, a mixture of water and an organic solvent (e.g., toluene, xylene, and acetone), a mixture of a 5% aqueous boric acid solution and the above described organic solvent, or the like. Representative examples of such functional groups may include boronic acid ester groups represented by the following general formula (II), boronic anhydride groups represented by the following general formula (III), and boronic acid salt groups represented by the following general formula (IV):

[chem. 2]

(II)

[wherein $R_1$ and $R_2$ represent a hydrogen atom, an aliphatic hydrocarbon group (e.g., a linear or branched alkyl or alkenyl group having from 1 to 20 carbon atoms), an alicyclic hydrocarbon group (e.g., a cycloalkyl group and a cycloalkenyl group), or an aromatic hydrocarbon group (e.g., a phenyl group and a biphenyl group), and $R_1$ and $R_2$ may also be a same group or different groups respectively although a case that both $R_1$ and $R_2$ are hydrogen atoms is eliminated. Here, the aliphatic hydrocarbon group, the alicyclic hydrocarbon group, and the aromatic hydrocarbon group may have a substituent, and $R_1$ and $R_2$ may be combined together.]

[chem. 3]

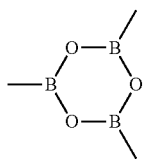
(III)

[chem. 4]

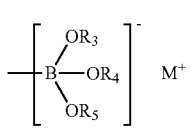
(IV)

[wherein $R_3$, $R_4$ and $R_5$ represent a hydrogen atom, an aliphatic hydrocarbon group, an alicyclic hydrocarbon group, or an aromatic hydrocarbon group like $R_1$ and $R_2$ mentioned above, and $R_3$, $R_4$, and $R_5$ may also be a same group or different groups respectively. M represents alkali metal.]

Specific examples of the boronic acid ester group represented by the general formula (II) may include boronic acid dimethyl ester group, boronic acid diethyl ester group, boronic acid dipropyl ester group, boronic acid diisopropyl ester group, boronic acid dibutyl ester group, boronic acid dihexyl ester group, boronic acid dicyclohexyl ester group, boronic acid ethylene glycol ester group, boronic acid propylene glycol ester group, boronic acid 1,3-propanediol ester group, boronic acid 1,3-butanediol ester group, boronic acid neopentyl glycol ester group, boronic acid catechol ester group, boronic acid glycerin ester group, boronic acid trimethylolethane ester group, boronic acid trimethylolpropane ester group, boronic acid diethanolamine ester group, and the like.

The boronic acid salt groups represented by the general formula (IV) may be alkali metal salt groups of boronic acid, etc. Specific examples include sodium boronate group, potassium boronate group, and the like.

Among such boron-containing functional groups, cyclic boronic acid ester groups are preferred in view of thermal stability. Examples of the cyclic boronic acid ester groups may include 5-membered or 6-membered ring-containing cyclic boronic acid ester groups. Specific examples may include boronic acid ethylene glycol ester group, boronic acid propylene glycol ester group, boronic acid 1,3-propanediol ester group, boronic acid 1,3-butanediol ester group, boronic acid glycerin ester group, and the like.

The grafting of the compound having a boronic acid group or boron-containing groups capable of being converted into a boronic acid group in the presence of water to an ethylene-vinyl acetate copolymer can be carried out in a known method after introducing a double bond into the ethylene-vinyl acetate copolymer in advance. A method of introducing a double bond in advance may include, for example, a method comprising eliminating an acetic acid of an ethylene-vinyl acetate copolymer by thermal decomposition, a method comprising copolymerizing by adding a component capable of introducing a double bond, such as butadiene and isoprene, when copolymerizing ethylene and vinyl acetate, and the like.

In the copolymer of ethylene, vinyl acetate, and acid or a derivative thereof, as the acid or a derivative thereof to be copolymerized with ethylene and vinyl acetate, unsaturated carboxylic acid or a derivative thereof can be used and it may include, for example, acrylic acid, methacrylic acid, fumaric acid, itaconic acid, and maleic acid; salt of the above acids; ester (methyl ester, ethyl ester, and the like) of the above acids; and anhydride of the above acids (maleic anhydride, itaconic anhydride, and the like). One type of them may be used singly, or two or more types may also be used in combination. Among them, maleic anhydride is used most preferably. The above acids and acid anhydrides may also be transformed partially to salt or ester by post-modification.

A method of copolymerizing ethylene, vinyl acetate, and acid or a derivative thereof is not particularly limited, and a known method, such as bulk polymerization, solution polymerization, suspension polymerization, and dispersion polymerization, is applied, and solution polymerization is used most preferably.

The acid-modified EVAc (F2) preferably has an amount of acid modification of from 0.01 to 2 m mol/g. In a case of less than 0.01 m mol/g, the reactivity to the EVOH (E) becomes poor and there is a risk of insufficient compatibility. The amount of acid modification is more preferably 0.02 m mol/g or more, and even more preferably 0.05 m mol/g or more. In contrast, in a case of more than 2 m mol/g, the reactivity to the EVOH (E) becomes excessive, so that a molded product becomes prone to generate irregularities. The amount of acid modification is more preferably 1.9 m mol/g or less, and even more preferably 1.5 m mol/g or less. The amount of acid modification of the present invention means, when modified with unsaturated carboxylic acid or a derivative thereof, an amount of acid components calculated by dividing an acid value measured based on JIS K2501 by a molecular weight of potassium hydroxide, and when modified with a compound having a boronic acid group or boron-containing groups capable of being converted into a boronic acid group in the presence of water, means an amount of acid components calculated from a ratio of hydrogen adjacent to boron to hydrogen in the main chain from a spectrum obtained by $^1$H-NMR after being dissolved in deuterated chloroform.

From the perspective of suppressing sticking to a screw or a cylinder in an extruder during melt molding, it is preferred that the resin composition (A) contains the S-EVOH (F1), while from the perspective of improving the transparency of the multilayer structure, it is preferred that the resin composition (A) contains the acid-modified EVAc (F2).

As components contained in the resin composition (A), in addition to the polyolefin (D), the EVOH (E), and the S-EVOH (F1) and/or the acid-modified EVAc (F2) above, it is preferred to blend an unmodified ethylene-vinyl acetate copolymer (G) (hereinafter, may be abbreviated as an unmodified EVAc (G)). The unmodified EVAc (G) used in the present invention is not acid-modified. Blending the unmodified EVAc (G) enables to enhance the dispersibility of the EVOH (E) and to obtain good gas barrier properties after retort processing. The unmodified EVAc (G) may be a random copolymer obtained by polymerizing ethylene with vinyl acetate in a known method and may also be a ternary copolymer obtained by further copolymerizing non acidic another monomer and a modified EVAc obtained by modified with a substance other than acid by grafting or the like. The unmodified EVAc (G) has unsaponified vinyl acetate units and their content is preferably from 2 to 40 mol % and more preferably from 5 to 25 mol %. When the content of vinyl acetate units is less than 2 mol % or more than 40 mol %, an effect sufficient to improve the dispersibility of the EVOH (E) may not be obtained. The unmodified EVAc (G) preferably has an MI (measured at 190° C., under the load of 2160 g) of from 0.1 to 50 g/10 minutes, more preferably from 0.5 to 30 g/10 minutes, and even more preferably from 1 to 20 g/10 minutes.

As components contained in the resin composition (A), in addition to the polyolefin (D), the EVOH (E), and the S-EVOH (F1) and/or the acid-modified EVAc (F2) above, it is also preferred to blend a metal salt (H) of fatty acid. Blending the metal salt (H) of fatty acid facilitates suppression of generating a fish eye in a molded product. The metal salt (H) of fatty acid may include a metal salt of higher aliphatic acid having a carbon number of from 10 to 26, such as lauric acid, stearic acid, myristic acid, behenic acid, and montanoic acid, particularly a metal salt of Group I, II, or III in the periodic table, which is, for example, a sodium salt, a potassium salt, a calcium salt, and a magnesium salt. It is also possible to use a zinc salt or a lead salt of the above fatty acid. Among these, a metal salt of the second group in the periodic table, such as a calcium salt and a magnesium salt, is preferred because it exhibits the effect by being added in a small amount.

Further, as the components contained in the resin composition (A), in addition to the polyolefin (D), the EVOH (E), and the S-EVOH (F1) and/or the acid-modified EVAc (F2) above, it is also preferred to blend hydrotalcite (I). Blending the hydrotalcite (I) facilitates suppression of generating a fish eye in a molded product. The hydrotalcite (I) may preferably include double salt hydrotalcite (I) represented by $$M_xAl_y(OH)_{2x+3y-2z}(A)_z \cdot aH_2O$$

(M denotes one or more of Mg, Ca, Sr, Ba, Zn, Cd, Pb, and Sn, A denotes $CO_3$ or $HPO_4$, x, y, and z are positive numbers, a is 0 or a positive number, and 2x+3y−2z>0).

In the above hydrotalcite, it is preferred that M is Mg, Ca, or Zn, and more preferred that it is a combination of two or more of them. Among these hydrotalcites, examples of particularly preferred ones may be as follows:

$Mg_6Al_2(OH)_{16}CO_3 \cdot 4H_2O$;
$Mg_8Al_2(OH)_{20}CO_3 \cdot 5H_2O$;
$Mg_5Al_2(OH)_{14}CO_3 \cdot 4H_2O$;
$Mg_{10}Al_2(OH)_{22}(CO_3)_2 \cdot 4H_2O$;
$Mg_6Al_2(OH)_{16}HPO_4 \cdot 4H_2O$;
$Ca_6Al_2(OH)_{16}CO_3 \cdot 4H_2O$;
$Zn_6Al_2(OH)_{16}CO_3 \cdot 4H_2O$;
$Mg_3ZnAl_2(OH)_{12}CO_3 \cdot 2.7H_2O$;
$Mg_6Zn_2Al_2(OH)_{20}CO_3 \cdot 1.6H_2O$;
$Mg_5Zn_{1.7}Al_{3.3}(OH)_{20}(CO_3)_{1.65} \cdot 4.5H_2O$.

It is also possible to blend other additives into the resin composition (A) as long as not inhibiting the effects of the invention. Examples of such an additive may include an antioxidant, an ultraviolet absorber, a plasticizer, an antistatic, a lubricant, a filler, and other polymer compounds. Specific examples of the additives may include the following.

Antioxidant: 2,5-di-t-butylhydroquinone, 2,6-di-t-butyl-p-cresol, 4,4'-thiobis(6-t-butylphenol), 2,2'-methylenebis(4-methyl-6-t-butylphenol), octadecyl-3-(3',5'-di-t-butyl-4'-hydroxyphenyl)propionate, 4,4'-thiobis(6-t-butylphenol), and the like.

Ultraviolet Absorber: ethylene-2-cyano-3,3'-diphenylacrylate, 2-(2'-hydroxy-5'-methylphenyl)benzotriazole, 2-(2'-hydroxy-3'-t-butyl-5'-methylphenyl) 5-chlorobenzotriazole, 2-hydroxy-4-methoxybenzophenone, 2,2'-dihydroxy-4-methoxybenzophenone, 2-hydroxy-4-octoxybenzophenone, and the like.

Plasticizer: dimethyl phthalate, diethyl phthalate, dioctyl phthalate, wax, liquid paraffin, phosphate ester, and the like.

Antistatic: pentaerythritol monostearate, sorbitan monopalmitate, sulfated polyolefins, polyethylene oxide, carbowax, and the like.

Lubricant: ethylene bis-stearamide, butyl stearate, and the like.

Filler: glass fibers, asbestos, ballastnite, calcium silicate, and the like.

In addition, many other polymer compounds can also be blended into the resin composition (A) as long as not inhibiting the actions and the effects of the present invention.

It is preferred that the resin composition (A) contains from 70 to 96 mass % of the polyolefin (D). When the polyolefin (D) content is more than 96 mass %, it becomes difficult to exhibit the effect of improving the gas barrier properties after retort processing by the EVOH (E). It is more preferred that the polyolefin (D) content is 94 mass % or less. In contrast, when the polyolefin (D) content is less than 70 mass %, there is a case of increasing an amount of water entering into the EVOH (B) layer during retort processing and deteriorating the gas barrier properties. It is more preferred that the polyolefin (D) content is 76 mass % or more.

It is preferred that the resin composition (A) contains from 2 to 20 mass % of the EVOH (E). When the EVOH (E) content is more than 20 mass %, the gas barrier properties after retort processing may become defective and a defective appearance may also occur. The EVOH (E) content is more preferably 15 mass % or less, and even more preferably 13 mass % or less. In contrast, when the EVOH (E) content is less than 2 mass %, it becomes difficult to exhibit the effect of improving the gas barrier properties after retort processing by the EVOH (E). It is more preferred that the EVOH (E) content is 3 mass % or more.

It is preferred that the resin composition (A) contains from 0.2 to 2.0 mass % of the S-EVOH (F1) and/or the acid-modified EVAc (F2). When the S-EVOH (F) content is more than 2.0 mass %, there is a risk of generating a fish eye. It is more preferred that the S-EVOH (F1) and/or acid-modified EVAc (F2) content is 1.5 mass % or less. In contrast, when the S-EVOH (F1) and/or acid-modified EVAc (F2) content is less than 0.2 mass %, the dispersion of the EVOH (E) becomes insufficient, and the gas barrier properties after retort processing are sometimes deteriorated and the appearance is also sometimes deteriorated. It is more preferred that the S-EVOH (F1) and/or acid-modified EVAc (F2) content is 0.3 mass % or more.

It is preferred that the resin composition (A) contains from 0.2 to 8.0 mass % of the unmodified EVAc (G). When the unmodified EVAc (G) content is more than 8.0 mass %, there is a risk of generating a fish eye. It is more preferred that the unmodified EVAc (G) content is 6.0 mass % or less. In contrast, when the unmodified EVAc (G) content is less than 0.2 mass %, the dispersion of the EVOH (E) becomes insufficient, and the gas barrier properties after retort processing are sometimes deteriorated and the appearance of the multilayer structure is also sometimes deteriorated. It is more preferred that the unmodified EVAc (G) content is 0.5 mass % or more.

It is preferred that the resin composition (A) contains from 0.02 to 1.0 mass % of the metal salt (H) of fatty acid. When the metal salt (H) of fatty acid content is more than 1.0 mass %, the transparency of a layer of the resin composition (A) is sometimes deteriorated. It is more preferred that the metal salt (H) of fatty acid content is 0.8 mass % or less. In contrast, when the metal salt (H) of fatty acid content is less than 0.02 mass %, it becomes prone to generate a burnt and a deposit stuck in a screw. It is more preferred that the metal salt (H) of fatty acid content is 0.05 mass % or more.

It is preferred that the resin composition (A) contains from 0.02 to 1.0 mass % of the hydrotalcite (I). When the hydrotalcite (I) content is more than 1.0 mass %, the transparency of a layer of the resin composition (A) is sometimes deteriorated. It is more preferred that the hydrotalcite (I) content is 0.8 mass % or less. In contrast, when the hydrotalcite (I) content is less than 0.02 mass %, the color phase of the multilayer structure is sometimes deteriorated. It is more preferred that the hydrotalcite (I) content is 0.05 mass % or more.

It is required that, in the resin composition (A), the EVOH (E) has a mass ratio [E/(F1+F2)] of from 0.05 to 30 to a total amount of the S-EVOH (F1) and the acid-modified EVAc (F2). When the mass ratio [E/(F1+F2)] is more than 30, the dispersibility of the EVOH (E) is poor and the gas barrier properties after retort processing become defective. The mass ratio [E/(F1+F2)] is preferably 27 or less and more preferably 20 or less. In contrast, when the mass ratio [E/(F1+F2)] is less than 0.05, the dispersion of the EVOH (E) becomes insufficient, and the gas barrier properties after retort processing are deteriorated and the appearance is also deteriorated. It is preferred that the mass ratio [E/(F1+F2)] is 2 or more.

It is preferred that, in the resin composition (A), the unmodified EVAc (G) has a mass ratio [G/(F1+F2)] to the total amount of the S-EVOH (F1) and the acid-modified EVAc (F2) of from 0.1 to 15. When the mass ratio [G/(F1+F2)] is more than 15, the gas barrier properties after retort processing sometimes becomes defective. It is more preferred that the mass ratio [G/(F1+F2)] is 13 or less. In contrast, when the mass ratio [G/(F1+F2)] is less than 0.1, the dispersion of the EVOH (E) is not stabilized and the gas barrier properties sometimes become poor. It is more preferred that the mass ratio [G/(F1+F2)] is 1 or more.

A mixing method to obtain the resin composition (A) is not particularly limited, and may include: a method comprising melt kneading after dry blending the polyolefin (D), the EVOH (E), and the S-EVOH (F1) and/or the acid-modified EVAc (F2) in one time; a method comprising melt kneading a portion of the polyolefin (D), the EVOH (E), and the S-EVOH (F1) and/or the acid-modified EVAc (F2) in advance, followed by blending other components thereinto and melt kneading; and a method comprising melt kneading after blending a multilayer structure containing a portion of the polyolefin (D), the EVOH (E), and the S-EVOH (F1) and/or the acid-modified EVAc (F2) into other components.

Among all, a method of melt kneading a scrap of collected offcuts and defective products generated when obtaining a molded object made of a multilayer structure, including a layer of the polyolefin (D) and a layer of the EVOH (E), and the S-EVOH (F1) and/or the acid-modified EVAc (F2) is preferred. Thus, the additive blended when melt kneading collected scraps is referred to as a recycling agent, and here, the S-EVOH (F1) and/or the acid-modified EVAc (F2) is used as the recycling agent. From the perspective of suppressing sticking to a screw or a cylinder in an extruder, it is preferred that the recycling agent contains the S-EVOH (F1), while from the perspective of improving the transparency of the multilayer structure, it is preferred that the recycling agent contains the acid-modified EVAc (F2). At this time, in a case of adding another component to the S-EVOH (F1) and/or the acid-modified EVAc (F2), it is preferred that they are melt kneaded in advance to make up a resin composition containing all of them, followed by adding it to the scraps. It is preferred that such recycling agent is blended into the scraps in the form of pellets. It is preferred that the scraps are pre-ground into an appropriate size, and it is a preferred method of producing a resin composition of the present invention to dry blend the recycling agent in the form of pellets with the ground scraps, followed by melt kneading. As the scraps, scraps obtained from one molded object may be used and related scraps obtained from two or more molded objects may also be used by mixing them. Since a multilayer structure including a layer of the polyolefin (D) and a layer of the EVOH (E) usually further has a layer of an adhesive resin, the scraps thus obtained and a resin composition obtained by using them turn out to contain the adhesive resin.

Further, the scraps as a raw material for the resin composition (A) may also be made of a multilayer structure including a recovery layer. That is, a molded product may be produced made of a multilayer structure including a recovery layer made of a resin composition obtained from a recovery and a scrap recovery of the molded product may also be used again as a raw material for a recovery layer in a similar multilayer structure.

When the resin composition (A) contains components other than the polyolefin (D), the EVOH (E), and the S-EVOH (F1) and/or the acid-modified EVAc (F2), a method of blending those components is not particularly limited and they can be blended in operations similar to each component of the (D), (E), and (F1) and/or (F2) described above. Among all, when the resin composition (A) contains the unmodified EVAc (G), the metal salt (H) of fatty acid, or the hydrotalcite (I), it is preferred to add these components to the S-EVOH (F1) and/or the acid-modified EVAc (F2) to use as the recycling agent. For a method of producing such recycling agent, similar methods as above are employed.

It is required that, in the resin composition (A), the polyolefin (D) has the EVOH (E) having an average particle diameter of from 0.1 to 1.8 µm dispersed in a matrix thereof. When the average particle diameter of the EVOH (E) is more than 1.8 the dispersibility of the EVOH (E) is poor and the gas barrier properties after retort processing become defective. The EVOH (E) preferably has an average particle diameter of 1.7 µm or less and more preferably 1.5 µm or less. In contrast, to make the average particle diameter of the EVOH (E) to be less than 0.1 µm is not realistic because an effect of improving the gas barrier properties is not expected that is worth the required enormous labor.

When the dispersibility of the EVOH (E) in the resin composition (A) is good, the surface area of the EVOH (E) increases, so that the EVOH (E) in the resin composition (A) tends to absorb moisture easily during retort processing, and further the humidity of the EVOH (E) in the resin composition (A) tends to decrease after retort processing.

The multilayer structure of the present invention is a multilayer structure having a layer of the resin composition (A) and a layer of the EVOH (B) obtained as above, and a layer of polyolefin (C) arranged on one side or both sides of those layers. At this time, as the EVOH (B), it is possible to use what is same as the EVOH (E). As the polyolefin (C), it is also possible to use what is same as the polyolefin (D).

It is preferred that the polyolefin (C) has a melting point of from 120 to 220° C. from the perspective of heat resistance in retort processing conditions (120° C., 0.15 MPa, for 30 minutes). The polyolefin (C) has a melting point of more preferably 122° C. or more and more preferably 210° C. or less.

As a method of producing the multilayer structure of the present invention, so-called coextrusion molding is preferred to use a number of extruders corresponding to the types of resin layer and laminate layers of the resins melt in each extruder for simultaneous extrusion molding. As another method, it is also possible to employ a molding method, such as extrusion coating and dry lamination. In addition, the multilayer structure of the present invention is subjected to a stretching operation, such as uniaxial stretching, biaxial stretching, and blow stretching, thereby also enabling to obtain a molded object having improved mechanical properties, gas barrier properties, and the like.

The multilayer structure of the present invention has a layer of the resin composition (A) and a layer of the EVOH (B), and a layer of polyolefin (C) arranged on one side or both sides of those layers. It is also preferred to have: the layer of the resin composition (A); the layer of the EVOH (B); and layers of the polyolefin (C) arranged on both sides sandwiching them. Indicating an adhesive resin as (AD), it is preferred to have a layer constitution as follows. Here, as the adhesive resin, it is possible to preferably use a modified polyolefin resin modified with unsaturated carboxylic acid or a derivative thereof.

| Five Layers | C/AD/B/AD/A |
| Six Layers | C/A/AD/B/AD/C |
| | C/A/AD/B/AD/A |
| Seven Layers | C/A/AD/B/AD/A/C |
| Eight Layers | C/A/AD/B/AD/B/AD/C |
| | C/A/AD/B/AD/B/AD/A |
| Nine Layers | C/A/AD/B/AD/B/AD/A/C |

Among all, a multilayer structure is preferred in which layers of the resin composition (A) are arranged on both sides sandwiching the layer of the EVOH (B), and the layer of the polyolefin (C) is further arranged on one side or both sides of all those layers. A multilayer structure is also preferred in which layers of the resin composition (A) are arranged on both sides sandwiching the layer of the EVOH (B), and layers of the polyolefin (C) are further arranged on both sides sandwiching all those layers. When the layers of the resin composition (A) are arranged on both sides of the layer of the EVOH (B), particles of the EVOH (E) dispersed in the resin composition (A) absorb the moisture, thereby suppressing an increase in the percentage of moisture content of the layer of the EVOH (B) during retort processing. As a result, a decrease in the gas barrier properties in the multilayer structure is suppressed during retort processing. Further, after retort processing, moisture release in the resin composition (A) is fast, so that the gas barrier properties of the multilayer structure recovers quickly.

It is required that the layer of the resin composition (A) in the multilayer structure of the present invention has a thickness of from 50 to 1000 µm. When the layer of the resin composition (A) has a thickness of more than 1000 µm, the appearance of the multilayer structure becomes defective. It is preferred that the layer of the resin composition (A) has a thickness of 950 µm or less. In contrast, when the layer of the resin composition (A) has a thickness of less than 50 µm, the gas barrier properties become defective after retort processing. It is preferred that the layer of the resin composition (A) has a thickness of 100 µm or more.

It is required that the layer of the polyolefin (C) in the multilayer structure of the present invention has a thickness of from 25 to 1000 µm. When the multilayer structure of the present invention has a layer of the resin composition (A), a layer of the EVOH (B), and layers of the polyolefin (C) arranged on both sides sandwiching those layers, it is preferred that both of the layers of the polyolefin (C) on both sides have a thickness of from 25 to 1000 µm. A case that the layers of the polyolefin (C) have a thickness of more than 1000 µm is not preferred from the perspective of economic efficiency. It is preferred that the layers of the polyolefin (C) have a thickness of 800 µm or less. In contrast, in a case that the layers of the polyolefin (C) have a thickness of less than 25 µm, a defective appearance occurs. The layers of the polyolefin (C) preferably have a thickness of 50 µm or more and more preferably 100 µm or more.

It is preferred that the entire multilayer structure of the present invention has a thickness of from 200 to 10000 µm. A case that the entire multilayer structure has a thickness of thicker than 10000 µm is not preferred from the perspective of economic efficiency. It is more preferred that the entire multilayer structure has a thickness of 8000 µm or less. In contrast, in a case that the entire multilayer structure has a thickness of less than 200 µm, the structure sometimes breaks due to the insufficient strength of the multilayer structure. The entire multilayer structure has a thickness of more preferably 400 µm or more and even more preferably 500 µm or more.

It is preferred that, in the multilayer structure of the present invention, the layer of the EVOH (B) has a thickness of from 6 to 12% of a thickness of the entire multilayer structure. When the layer of the EVOH (B) has a thickness of thicker than 12% of the thickness of the entire multilayer structure, molding defects sometimes occur. It is more preferred that the layer of the EVOH (B) has a thickness of 10% or less of the thickness of the entire multilayer structure. In contrast, when the layer of the EVOH (B) has a thickness of thinner than 6% of the thickness of the entire multilayer structure, unevenness in the thickness of the EVOH becomes larger, so that the gas barrier properties are prone to become defective. It is more preferred that the layer of the EVOH (B) has a thickness of 6.5% or more of the thickness of the entire multilayer structure.

Although applications of a molded product made of the multilayer structure of the present invention is not particularly limited, it is preferred to be a container. As a form of the container, examples may include a pouch, a bottle, a cup, and the like. Since the container made of the multilayer structure of the present invention exhibits excellent as barrier properties even in conditions of high temperature and high humidity, it is particularly preferred as a container for retort processing. For the retort processing, even other than regular retort processing to heat at 100° C. or more and add pressure, steam retort processing, water cascading retort processing, microwave retort processing, and the like are also employed.

The multilayer structure of the present invention does not easily decrease the gas barrier properties even after going through processing in conditions of high temperature and high humidity such as retort processing. In a case that retort processing the multilayer structure for 30 minutes at 120° C. and 0.15 MPa, it is preferred that the oxygen transmission rate after 24 hours passed is from 0.1 to 6 cc/m$^2$·day·atm. This means that, when measured in an environment at 20° C. and relative humidity at 65% after 24 hours since retort processing, in a condition of an oxygen differential pressure of 1 atmosphere, a volume of oxygen transmitting through a multilayer structure having an area of 1 m$^2$ for one day is from 0.1 to 6 cc. A more preferred oxygen transmission rate after retort processing is 5.5 cc/m$^2$·day·atm or less.

Further, the multilayer container is useful for a food packaging container, a medicine packaging container, and the like that require retort processing. A package having a content filled therein is also a preferred embodiment. It is also a preferred embodiment to retort process the package for sterilization processing and disinfection processing.

EXAMPLES

In present Examples, the following raw materials were used. In Production Examples, Examples, and Comparative Examples below, parts are based on mass, unless otherwise specified.
[Polyolefin (C) and Polyolefin (D)]
PP-1: polypropylene [density of 0.90 g/cm$^3$, melt index of 1.4 g/10 minutes (ASTM-D 1238, 230° C., load of 2160 g)], "NOVATEC PP EA7A" produced by Japan Polypropylene Corporation
[EVOH (B) and EVOH (E)]
EVOH-1: ethylene content of 32 mol %, degree of saponification of 99.7 mol %, limiting viscosity of 1.1 dL/g at 30° C. in aqueous phenol, density of 1.15 g/cm$^3$, melt index of 1.6 g/10 minutes (ASTM-D 1238, 230° C., load of 2160 g)
[S-EVOH (F1)]
F-1: ethylene content of 89 mol %, degree of saponification of 97 mol %, melt index of 5.1 g/10 minutes (ASTM-D 1238, 190° C., load of 2160 g)
[Acid-Modified EVA (F2)]
F-2: ethylene content of 89 mol %, acid value of 10 mg KOH/g (JIS K 2501-2003), melt index of 16.0 g/10 minutes (ASTM-D 1238, 190° C., load of 2160 g)
[Unmodified EVAc (G)]
G-1: vinyl acetate content of 19 mass % (7 mol %), melt index of 2.5 g/10 minutes (ASTM-D 1238, 190° C., load of 2160 g), "EVAFLEX EV460" produced by Du Pont-Mitsui Co., Ltd.
[Metal Salt (H) of Fatty Acid]
H-1: calcium stearate

[Hydrotalcite (I)]
I-1: "ZHT-4A" produced by Kyowa Chemical Industry Co., Ltd.
[Others]
LDPE: density of 0.92 g/cm$^3$, melt index of 2.5 g/10 minutes (ASTM-D 1238, 230° C., load of 2160 g), "F120N" produced by Ube-Maruzen Polyethylene Kabushiki Kaisha
Adhesive Resin: density of 0.90 g/cm$^3$, melt index of 3.2 g/10 minutes (ASTM-D 1238, 230° C., load of 2160 g), "MODIC AP P604V" produced by Mitsubishi Chemical Corporation
Antioxidant: pentaerythritol-tetrakis[3-(3,5-di-t-butyl-4-hydroxyphenyl)propionate], "IRGANOX 1010" produced by Ciba Specialty Chemicals Inc.

Measurements were carried out in the following methods respectively for a multilayered film obtained in Example regarding a dispersed particle diameter of the EVOH (E) contained in a layer of the resin composition (A), an oxygen transmission rate before and after retort processing, and an appearance of a thermoformed container.
[Dispersed Particle Diameter of EVOH (E) Contained in Layer of Resin Composition (A)]

A multilayered film was carefully cut with a microtome in a direction perpendicular to the film surface and a resin composition (A) layer was further taken out using a scalpel. Platinum was vapor deposited on the exposed cross section in a reduced pressure atmosphere. The cross section with platinum vapor deposited thereon was taken in a picture using a scanning electron microscope (SEM) with 10000 magnification, a region in this picture including approximately 20 particles of the EVOH (E) was selected, particle diameters of the respective particle images in the region were measured, and their average value was calculated to define it as a dispersed particle diameter. For the particle diameters of the respective particles, a longer diameter (longest part) of the particles observed in the picture was measured to define it as the particle diameter. The film was cut vertically in a direction of extrusion, and the picture was taken from a direction vertical to the cross section.
[Oxygen Transmission Rate before Retort Processing (OTR before Retort Processing)]

After leaving a multilayered film in a room at 20° C. and 65% RH for one day, an oxygen transmission rate was measured. It was calculated using cc/m$^2$·day·atm as a unit. Measurement conditions were as follows.
Oxygen Transmission Rate Measurement System: MOCON OX-TRAN 2/20 (manufactured by Modern Controls, Inc.)
Oxygen Pressure: 1 atmosphere
Carrier Gas Pressure: 1 atmosphere
[Oxygen Transmission Rate after Retort Processing (OTR after Retort Processing)]

A multilayered film was hot water retort processed in conditions of 120° C., 30 minutes, 0.15 MPa with a retorting apparatus ("Flavor Ace RCS-60" manufactured by Hisaka Works, Ltd.). After retort processing, heating was stopped. At the time when the temperature inside the retorting apparatus became 60° C., the multilayered film was taken out of the retorting apparatus. After leaving the multilayered film in a room at 20° C. and 65% RH for one day, an oxygen transmission rate was measured. It was calculated using cc/m$^2$·day·atm as a unit. Measurement conditions were as follows.
Oxygen Transmission Rate Measurement System: MOCON OX-TRAN 2/20 (manufactured by Modern Controls, Inc.)
Oxygen Pressure: 1 atmosphere
Carrier Gas Pressure: 1 atmosphere

[Appearance of Thermoformed Container]

Five thermoformed containers were prepared at random, and a side of each container was seen through with a fluorescent lamp and observed to be visually evaluated as follows.
A: without stripes, constant color phase
B: with stripes, uneven color phase

[Production of Masterbatch]

In accordance with the following methods, masterbatches (MB1 through MB8) were obtained.

MB1

Using F-1 as the S-EVOH (F1), G-1 as the EVAc (G), H-1 as the metal salt (H) of fatty acid, I-1 as the hydrotalcite (I), and an antioxidant, they were blended by dry blending to have a mass ratio of F-1/G-1/H-1/I-1/antioxidant=25/67.5/5/2.5/0.2. A mixture thus obtained was melt kneaded at an extrusion temperature of 200° C. using a corotating twin screw extruder (TEX-30N manufactured by Japan Steel Works, Ltd.) of 30 mmφ, followed by pelletizing to obtain a masterbatch (MB1).

MB2

Using F-1 as the S-EVOH (F1), G-1 as the EVAc (G), H-1 as the metal salt (H) of fatty acid, I-1 as the hydrotalcite (I), and an antioxidant, they were melt kneaded in a same manner as MB1 other than blending them by dry blending to have a mass ratio of F-1/G-1/H-1/I-1/antioxidant=14.3/78.2/5/2.5/0.2 to obtain a masterbatch (MB2).

MB3

Using F-1 as the S-EVOH (F1), LDPE, H-1 as the metal salt (H) of fatty acid, I-1 as the hydrotalcite (I), and an antioxidant, they were melt kneaded in a same manner as MB1 other than blending them by dry blending to have a mass ratio of F-1/LDPE/H-1/I-1/antioxidant=25/67.5/5/2.5/0.2 to obtain a masterbatch (MB3).

MB4

Using F-1 as the S-EVOH (F1), G-1 as the EVAc (G), H-1 as the metal salt (H) of fatty acid, I-1 as the hydrotalcite (I), and an antioxidant, they were melt kneaded in a same manner as MB1 other than blending them by dry blending to have a mass ratio of F1/G-1/H-1/I-1/antioxidant=50/42.5/5/2.5/0.2 to obtain a masterbatch (MB4).

MB5

Using F-2 as the acid-modified EVA (F2), G-1 as the EVAc (G), H-1 as the metal salt (H) of fatty acid, I-1 as the hydrotalcite (I), and an antioxidant, they were melt kneaded in a same manner as MB1 other than blending them by dry blending to have a mass ratio of F 2/G-1/H-1/I-1/antioxidant=25/67.5/5/2.5/0.2 to obtain a masterbatch (MB5).

MB6

Using F-2 as the acid-modified EVA (F2), LDPE, H-1 as the metal salt (H) of fatty acid, I-1 as the hydrotalcite (I), and an antioxidant, they were melt kneaded in a same manner as MB1 other than blending them by dry blending to have a mass ratio of F-2/LDPE/H-1/I-1/antioxidant=25/67.5/5/2.5/0.2 to obtain a masterbatch (MB6).

MB7

Using F-1 as the S-EVOH (F1), G-1 as the EVAc (G), H-1 as the metal salt (H) of fatty acid, I-1 as the hydrotalcite (I), and an antioxidant, they were melt kneaded in a same manner as MB1 other than blending them by dry blending to have a mass ratio of F-1/G-1/H-1/I-1/antioxidant=5/85.0/5/5/0.2 to obtain a masterbatch (MB7).

MB8

Using F-2 as the acid-modified EVA (F2), G-1 as the EVAc (G), H-1 as the metal salt (H) of fatty acid, I-1 as the hydrotalcite (I), and an antioxidant, they were melt kneaded in a same manner as MB1 other than blending them by dry blending to have a mass ratio of F-2/G-1/H-1/I-1/antioxidant=10/82.5/5/2.5/0.2 to obtain a masterbatch (MB8).

Example 1

Production of Recovery

Using PP-1 as the polyolefin (D) for outermost layers, EVOH-1 as the EVOH (E) for an innermost layer, "MODIC AP P604V" as the adhesive resin layers, three-type five-layer coextrusion of polyolefin layer/adhesive resin layer/EVOH layer/adhesive resin layer/polyolefin layer=340 μm/30 μm/60 μm/30 μm/340 μm was carried out with a feedblock die to prepare a multilayer structure. The respective resins were supplied to the feedblock using a 32 mmφ extruder for the polyolefin layers, a 25 mmφ extruder for the adhesive resin layers, and a 20 mmφ extruder for the EVOH layer, respectively. The temperature for extrusion was 220° C. for each resin, and the temperatures in a die section and a feedblock section were also 220° C.

Subsequently, the multilayer structure thus obtained was ground with a grinder of 8 mmφ diameter meshes to obtain a recovery. A recovery thus obtained had a mass ratio of each component of PP-1/EVOH-1/adhesive resin=83.3/9.4/7.3.

[Preparation of Multilayered Film]

Using PP-1 as the polyolefin (C) for outermost layers, a resin composition (A) having the recovery and the masterbatch (MB1) blended therein in a mass ratio of recovery/masterbatch (MB1)=100/3 for layers adjacent to the outermost layers, EVOH-1 as the EVOH (B) for an innermost layer, and "MODIC AP P604V" as the adhesive resin layers, four-type seven-layer coextrusion of polyolefin layer/resin composition (A) layer/adhesive resin layer/EVOH layer/adhesive resin layer/resin composition (A) layer/polyolefin layer=120 μm/220 μm/30 μm/60 μm/30 μm/220 μm/120 μm was carried out with a feedblock die to prepare a multilayered film. The respective resins were supplied to the feedblock using a 32 mmφ extruder for the polyolefin layers and the resin composition (A) layers, a 25 mmφ extruder for the adhesive resin layers, a 20 mmφ extruder for the EVOH layer, respectively. The temperature for extrusion was 220° C. for each resin, and the temperatures in a die section and a feedblock section were also 220° C.

Taking the multilayered films thus obtained, a particle diameter of the EVOH (E) in the resin composition (A) layer was measured. Results are shown in Table 2.

The multilayered film thus obtained was thermoformed to obtain a thermoformed container. Forming conditions were as follows.

Thermoforming Machine: vacuum pressure deep draw forming machine, model FX-0431-3 (manufactured by Asano Seisakusho) Compressed Air Pressure: atmospheres of 5 kgf/cm²
Die Shape (Round Cup Shape): top of 75 mmφ, bottom of 60 mmφ, depth of 30 mm, drawing ratio S=0.4)
Die Temperature: 70° C.
Sheet Temperature: 130° C.
Heater Temperature: 400° C.
Plug Dimensions: 45φ×65 mm
Plug Temperature: 120° C.

An appearance of the thermoformed container thus obtained was evaluated and results are shown in Table 2.

Example 2

A multilayered film was prepared in a same manner as Example 1 other than using the masterbatch (MB2) instead of the masterbatch (MB1) to obtain a thermoformed container for evaluation. The layer constitution is shown in Table 1, and the composition of the resin composition (A) and evaluation results of the multilayer structure are collectively shown in Table 2.

Example 3

A multilayered film was prepared in a same manner as Example 1 other than defining a layer thickness of the multilayer structure used for production of the recovery in Example 1 as polyolefin layer/adhesive resin layer/EVOH layer/adhesive resin layer/polyolefin layer=390 μm/3.5 μm/7 μm/3.5 μm/390 μm to obtain a thermoformed container for evaluation. The mass ratio of each component of the recovery was PP-1/EVOH-1/adhesive resin=98.0/1.1/0.9. The layer constitution is shown in Table 1, and the composition of the resin composition (A) and evaluation results of the multilayer structure are collectively shown in Table 2.

Example 4

A multilayered film was prepared in a same manner as Example 1 other than defining a layer thickness of the multilayer film in Example 1 as polyolefin layer/resin composition (A) layer/adhesive resin layer/EVOH layer/adhesive resin layer/resin composition (A) layer/polyolefin layer=220 μm/120 μm/30 μm/60 μm/30 μm/120 μm/220 μm to obtain a thermoformed container for evaluation. The layer constitution is shown in Table 1, and the composition of the resin composition (A) and evaluation results of the multilayer structure are collectively shown in Table 2.

Example 5

A multilayered film was prepared in a same manner as Example 1 other than using the masterbatch (MB3) instead of the masterbatch (MB1) to obtain a thermoformed container for evaluation. The layer constitution is shown in Table 1, and the composition of the resin composition (A) and evaluation results of the multilayer structure are collectively shown in Table 2.

Example 6

A multilayered film was prepared in a same manner as Example 1 other than defining a layer thickness of the multilayer structure used for production of the recovery in Example 1 as polyolefin layer/adhesive resin layer/EVOH layer/adhesive resin layer/polyolefin layer=200 μm/20 μm/120 μm/20 μm/200 μm and using the masterbatch (MB4) instead of the masterbatch (MB1) to obtain a thermoformed container for evaluation. The mass ratio of each component of the recovery was PP-1/EVOH-1/adhesive resin=67.4/25.8/6.7. The layer constitution is shown in Table 1, and the composition of the resin composition (A) and evaluation results of the multilayer structure are collectively shown in Table 2.

Example 7

A multilayered film was prepared in a same manner as Example 1 other than using the masterbatch (MB5) instead of the masterbatch (MB1) to obtain a thermoformed container for evaluation. The layer constitution is shown in Table 1, and the composition of the resin composition (A) and evaluation results of the multilayer structure are collectively shown in Table 2.

Example 8

A multilayered film was prepared in a same manner as Example 1 other than using the masterbatch (MB6) instead of the masterbatch (MB1) to obtain a thermoformed container for evaluation. The layer constitution is shown in Table 1, and the composition of the resin composition (A) and evaluation results of the multilayer structure are collectively shown in Table 2.

Example 9

A multilayered film was prepared in a same manner as Example 1 other than defining a layer constitution and a layer thickness of the multilayer film in Example 1 as polyolefin layer/resin composition (A) layer/adhesive resin layer/EVOH layer/adhesive resin layer/resin composition (A) layer=120 μm/220 μm/30 μm/60 μm/30 μm/340 μm and carrying out four-type six-layer coextrusion to obtain a thermoformed container for evaluation. When obtaining the thermoformed container, the polyolefin layer was set as the innermost layer. The layer constitution is shown in Table 1, and the composition of the resin composition (A) and evaluation results of the multilayer structure are collectively shown in Table 2.

Comparative Example 1

A multilayered film was prepared in a same manner as Example 1 other than using the masterbatch (MB7) instead of the masterbatch (MB1) to obtain a thermoformed container for evaluation. The layer constitution is shown in Table 1, and the composition of the resin composition (A) and evaluation results of the multilayer structure are collectively shown in Table 2.

Comparative Example 2

A multilayered film was prepared in a same manner as Example 1 other than defining a layer thickness of the multilayer structure used for production of the recovery in Example 1 as polyolefin layer/adhesive resin layer/EVOH layer/adhesive resin layer/polyolefin layer=200 μm/20 μm/120 μm/20 μm/200 μm to obtain a thermoformed container for evaluation. The mass ratio of each component of the recovery was PP-1/EVOH-1/adhesive resin=67.4/25.8/6.7. The layer constitution is shown in Table 1, and the composition of the resin composition (A) and evaluation results of the multilayer structure are collectively shown in Table 2.

Comparative Example 3

A multilayered film was prepared in a same manner as Example 1 other than defining a layer thickness of the multilayer film in Example 1 as polyolefin layer/resin composition (A) layer/adhesive resin layer/EVOH layer/adhesive resin layer/resin composition (A) layer/polyolefin layer=320 μm/20 μm/30 μm/60 μm/30 μm/20 μm/320 μm to obtain a thermoformed container for evaluation. The layer constitution is shown in Table 1, and the composition of the resin composition (A) and evaluation results of the multilayer structure are collectively shown in Table 2.

Comparative Example 4

A multilayered film was prepared in a same manner as Example 1 other than defining a layer thickness of the multilayer film in Example 1 as polyolefin layer/resin composition (A) layer/adhesive resin layer/EVOH layer/adhesive resin layer/resin composition (A) layer/polyolefin layer=20 μm/320 μm/30 μm/60 μm/30 μm/320 μm/20 μm to obtain a thermoformed container for evaluation. The layer constitution is shown in Table 1, and the composition of the resin composition (A) and evaluation results of the multilayer structure are collectively shown in Table 2.

Comparative Example 5

A multilayered film was prepared in a same manner as Example 1 other than using the masterbatch (MB8) instead of the masterbatch (MB1) to obtain a thermoformed container for evaluation. The layer constitution is shown in Table 1, and the composition of the resin composition (A) and evaluation results of the multilayer structure are collectively shown in Table 2.

TABLE 1

|  |  | Example 1 | Example 2 | Example 3 | Example 4 | Example 5 | Example 6 | Example 7 | Example 8 |
|---|---|---|---|---|---|---|---|---|---|
| Polyolefin (C) Layer | μm | 120 | 120 | 120 | 220 | 120 | 120 | 120 | 120 |
| Resin Composition (A) Layer | μm | 220 | 220 | 220 | 120 | 220 | 220 | 220 | 220 |
| Adhesive Layer | μm | 30 | 30 | 30 | 30 | 30 | 30 | 30 | 30 |
| EVOH (B) Layer | μm | 60 | 60 | 60 | 60 | 60 | 60 | 60 | 60 |
| Adhesive Layer | μm | 30 | 30 | 30 | 30 | 30 | 30 | 30 | 30 |
| Resin Composition (A) Layer | μm | 220 | 220 | 220 | 120 | 220 | 220 | 220 | 220 |
| Polyolefin (C) Layer | μm | 120 | 120 | 120 | 220 | 120 | 120 | 120 | 120 |
| Total Thickness | μm | 800 | 800 | 800 | 800 | 800 | 800 | 800 | 800 |
| EVOH (B) Layer Thickness Ratio | % | 7.5 | 7.5 | 7.5 | 7.5 | 7.5 | 7.5 | 7.5 | 7.5 |

|  |  | Example 9 | Comparative Example 1 | Comparative Example 2 | Comparative Example 3 | Comparative Example 4 | Comparative Example 5 |
|---|---|---|---|---|---|---|---|
| Polyolefin (C) Layer | μm | — | 120 | 120 | 320 | 20 | 120 |
| Resin Composition (A) Layer | μm | 340 | 220 | 220 | 20 | 320 | 220 |
| Adhesive Layer | μm | 30 | 30 | 30 | 30 | 30 | 30 |
| EVOH (B) Layer | μm | 60 | 60 | 60 | 60 | 60 | 60 |
| Adhesive Layer | μm | 30 | 30 | 30 | 30 | 30 | 30 |
| Resin Composition (A) Layer | μm | 220 | 220 | 220 | 20 | 320 | 220 |
| Polyolefin (C) Layer | μm | 120 | 120 | 120 | 320 | 20 | 120 |
| Total Thickness | μm | 800 | 800 | 800 | 800 | 800 | 800 |
| EVOH (B) Layer Thickness Ratio | % | 7.5 | 7.5 | 7.5 | 7.5 | 7.5 | 7.5 |

TABLE 2

|  |  |  | Example 1 | Example 2 | Example 3 | Example 4 | Example 5 | Example 6 | Example 7 | Example 8 |
|---|---|---|---|---|---|---|---|---|---|---|
| Resin Composition (A) | Polyolefin (D) | D-1 | 83.3 | 83.3 | 98.0 | 83.3 | 83.3 | 67.4 | 83.3 | 83.3 |
|  | EVOH (E) | E-1 | 9.4 | 9.4 | 1.1 | 9.4 | 9.4 | 25.8 | 9.4 | 9.4 |
|  | S-EVOH (F1) | F-1 | 0.75 | 0.43 | 0.75 | 0.75 | 0.75 | 1.5 | 0 | 0 |
|  | Acid-modified EVA (F2) | F-2 | 0 | 0 | 0 | 0 | 0 | 0 | 0.75 | 0.75 |
|  | EVAc (G) | G-1 | 2.02 | 2.34 | 2.02 | 2.02 | 0 | 1.27 | 2.02 | 0 |
|  | Metal Salt (H) of Fatty Acid | H-1 | 0.15 | 0.15 | 0.15 | 0.15 | 0.15 | 0.15 | 0.15 | 0.15 |

TABLE 2-continued

|  |  |  |  |  |  |  |  |  |  |
|---|---|---|---|---|---|---|---|---|---|
|  | Hydrotalcite (I) | I-1 | 0.075 | 0.075 | 0.075 | 0.075 | 0.075 | 0.075 | 0.075 | 0.075 |
|  | Adhesive Resin |  | 7.3 | 7.3 | 0.9 | 7.3 | 7.3 | 6.7 | 7.3 | 7.3 |
|  | Antioxidant |  | 0.006 | 0.006 | 0.006 | 0.006 | 0.006 | 0.006 | 0.006 | 0.006 |
|  | LDPE |  | 0 | 0 | 0 | 0 | 2.02 | 0 | 0 | 2.02 |
| E/(F1 + F2) |  |  | 12.5 | 21.9 | 1.5 | 12.5 | 12.5 | 17.2 | 12.5 | 12.5 |
| G/(F1 + F2) |  |  | 2.69 | 5.44 | 2.69 | 2.69 | 0 | 0.85 | 2.69 | 0 |
| (E)[*1] |  |  | 9.1 | 9.1 | 1.0 | 9.1 | 9.1 | 25.1 | 9.1 | 9.1 |
| Dispersed Particle Diameter of EVOH (E) (μm) |  |  | 1.2 | 1.4 | 1.2 | 1.2 | 1.7 | 1.7 | 1.1 | 1.5 |
| OTR before Retort Processing[*2] |  |  | 0.6 | 0.6 | 0.6 | 0.6 | 0.6 | 0.6 | 0.6 | 0.7 |
| OTR after Retort Processing[*2] |  |  | 3.7 | 3.8 | 4.9 | 5.7 | 4.2 | 5.9 | 3.6 | 3.9 |
| Appearance |  |  | A | A | A | A | A | A | A | A |

|  |  |  | Example 8 | Example 9 | Comparative Example 1 | Comparative Example 2 | Comparative Example 3 | Comparative Example 4 | Comparative Example 5 |
|---|---|---|---|---|---|---|---|---|---|
| Resin Composition (A) | Polyolefin (D) | D-1 | 83.3 | 83.3 | 83.3 | 67.4 | 83.3 | 83.3 | 83.3 |
|  | EVOH (E) | E-1 | 9.4 | 9.4 | 9.4 | 25.8 | 9.4 | 9.4 | 9.4 |
|  | S-EVOH (F1) | F-1 | 0 | 0.75 | 0.15 | 0.75 | 0.75 | 0.75 | 0 |
|  | Acid-modified EVA (F2) | F-2 | 0.75 | 0 | 0 | 0 | 0 | 0 | 0.30 |
|  | EVAc (G) | G-1 | 0 | 2.02 | 2.54 | 2.02 | 2.02 | 2.02 | 2.47 |
|  | Metal Salt (H) of Fatty Acid | H-1 | 0.15 | 0.15 | 0.15 | 0.15 | 0.15 | 0.15 | 0.15 |
|  | Hydrotalcite (I) | I-1 | 0.075 | 0.075 | 0.15 | 0.075 | 0.075 | 0.075 | 0.075 |
|  | Adhesive Resin |  | 7.3 | 7.3 | 7.3 | 6.7 | 7.3 | 7.3 | 7.3 |
|  | Antioxidant |  | 0.006 | 0.006 | 0.006 | 0.006 | 0.006 | 0.006 | 0.006 |
|  | LDPE |  | 2.02 | 0 | 0 | 0 | 0 | 0 | 0 |
| (E/F1 + F2) |  |  | 12.5 | 12.5 | 62.7 | 34.4 | 12.5 | 12.5 | 31.3 |
| (G/F1 + F2) |  |  | 0 | 2.69 | 16.9 | 2.69 | 2.69 | 2.69 | 8.23 |
| (E)[*1] |  |  | 9.1 | 9.1 | 9.1 | 25.1 | 9.1 | 9.1 | 9.1 |
| Dispersed Particle Diameter of EVOH (E) (μm) |  |  | 1.5 | 1.2 | 2.1 | 2.3 | 1.2 | 1.2 | 1.9 |
| OTR before Retort Processing[*2] |  |  | 0.7 | 0.6 | 0.6 | 0.6 | 0.6 | 0.7 | 0.6 |
| OTR after Retort Processing[*2] |  |  | 3.9 | 3.6 | 7.2 | 9.7 | 6.3 | 4.1 | 6.2 |
| Appearance |  |  | A | A | A | B | A | B | A |

[*1]Mass % of EVOH (E) in Resin Composition (A)
[*2]unit: cc/m$^2$ · day · atm

From the results in Table 2, it is understood that the multilayer structures of Examples 1 through 9 having all of the mass ratio [E/(F1+F2)] of the EVOH (E) to the total amount of the S-EVOH (F1) and the acid-modified EVAc (F2), the dispersed particle diameter of the EVOH (E), the layer thickness of the resin composition (A), and the layer thickness of the polyolefin (C) in the scope of the present claims were excellent in all of the OTR before retort processing, the OTR after retort processing, and the appearance.

Comparative Examples 1, 2, and 5 having the high mass ratio [E/(F1+F2)] of the EVOH (E) to the total amount of the S-EVOH (F1) and the acid-modified EVAc (F2) and the large dispersed particle diameter of the EVOH (E) had the defective OTRs after retort processing. Comparative Example 3 having the thin layers of the resin composition (A) had the defective OTR after retort processing, and Comparative Example 4 having the thin layers of the polyolefin (C) had the defective appearance.

The invention claimed is:

1. A retort processed package, comprising:
a multilayer container and a content in the container, the multilayer container comprising:
a layer of a resin composition (A);
a layer of a saponified ethylene-vinyl acetate copolymer (B) having an ethylene content of from 20 to 65 mol % and having a degree of saponification of vinyl acetate units of 96% or more; and
a layer of polyolefin (C) on a side of the layer of a resin composition (A) and the layer of a saponified ethylene-vinyl acetate copolymer (B),
wherein
the container comprises two of the layers of the resin composition (A), and the layer of the saponified ethylene-vinyl acetate copolymer (B) is between the layers of the resin composition (A),
the resin composition (A) comprises a polyolefin (D), a saponified ethylene-vinyl acetate copolymer (E) having an ethylene content of from 20 to 65 mol % and having a degree of saponification of vinyl acetate units of 96% or more, and from 0.3 to 2.0 mass % of the resin composition (A) of at least one copolymer (F) selected from the group consisting of a saponified ethylene-vinyl acetate copolymer (F1) having an ethylene content of from 68 to 98 mol % and having a degree of saponification of vinyl acetate units of 20% or more and an acid-modified ethylene-vinyl acetate copolymer (F2) having an ethylene content of from 68 to 98 mol %, a mass ratio (E/F) of the saponified ethylene-vinyl acetate copolymer (E) to a total of the copolymer (F) is from 0.05 to 30, the saponified ethylene-vinyl acetate copolymer (E) is dispersed as particles with an average particle diameter of from 0.1 to 1.8 μm in a matrix of the resin composition polyolefin (D), the layer of the resin composition (A) has a thickness of from 50 to 1000 μm, the layer of the polyolefin (C) has a thickness of from 25 to 1000 μm, and the container has an oxygen transmission rate after 24 hours passed since retort processed for 30 minutes at 120° C. and 0.15 MPa of from 0.1 to 6 cc/m$^2$·day·atm.

2. The retort processed package of claim 1,
wherein the structure comprises two of the layers of polyolefin (C),
the two layers of the resin composition (A) and the layer of the saponified ethylene-vinyl acetate copolymer (B) between said two layers are between the two layers of polyolefin (C),
each of the two layers of the polyolefin (C) have a thickness of from 25 to 1000 μm.

3. The retort processed package of claim 1,
wherein the resin composition (A) further comprises an unmodified ethylene-vinyl acetate copolymer (G), and
a mass ratio (G/F) of the unmodified ethylene-vinyl acetate copolymer (G) to a total of the copolymer (F) is from 0.1 to 15.

4. The retort processed package of claim 1, wherein the resin composition (A) comprises from 2 to 20 mass % of the saponified ethylene-vinyl acetate copolymer (E).

5. The retort processed package of claim 1,
wherein
either the layer of the polyolefin (C) is on a side of the layers of the resin composition (A) and the layer of the saponified ethylene-vinyl acetate copolymer (B), or the layers of the resin composition (A) and the layer of the saponified ethylene-vinyl acetate copolymer (B) are between two layers of the polyolefin (C).

6. The retort processed package of claim 5, wherein the layers of the resin composition (A) and the layer of the saponified ethylene-vinyl acetate copolymer (B) are between two layers of the polyolefin (C).

7. The retort processed package of claim 1, wherein the layer of the saponified ethylene-vinyl acetate copolymer (B) has a thickness of from 6 to 12% of a total thickness of the multilayer container.

8. The retort processed package of claim 1, wherein the multilayer container has a total thickness of from 200 to 10000 μm.

9. The retort processed package of claim 1, wherein the polyolefin (C) has a melting point of from 120 to 220° C.

10. A method of producing the retort processed package of claim 1, the method comprising:
melt molding the multilayer container with the resin composition (A), the saponified ethylene-vinyl acetate copolymer (B), and the polyolefin (C),
wherein the resin composition (A) is obtained by a process comprising melt kneading a scrap of a multilayer container, comprising a layer of polyolefin (D) and a layer of the saponified ethylene-vinyl acetate copolymer (E), and the copolymer (F).

11. The method of claim 10, further comprising:
melt kneading a scrap of a multilayer container, thereby obtaining the resin composition (A) prior to the melt molding,
wherein the multilayer container comprises a layer of the polyolefin (D) and a layer of the saponified ethylene-vinyl acetate copolymer (E).

12. The retort processed package of claim 1, wherein the polyolefin (D) comprises a polypropylene-based resin, a polyethylene-based resin, or any combination thereof.

13. The retort processed package of claim 12, wherein the polyolefin (D) comprises polypropylene, a propylene-based copolymer, polyethylene, an ethylene-based copolymer, or any combination thereof.

14. The retort processed package of claim 1, wherein the ethylene content of the saponified ethylene-vinyl acetate copolymer (E) is from 25 to 55 mol %.

15. The retort processed package of claim 1, wherein at least copolymer (F1) is present.

16. The retort processed package of claim 1, wherein at least copolymer (F2) is present.

* * * * *